B. A. MELVIN.
MOTOR VEHICLE SIGNAL.
APPLICATION FILED JAN. 20, 1914.

1,177,530.

Patented Mar. 28, 1916.
2 SHEETS—SHEET 1.

Witnesses
Philip E. Barnes
V. B. Hillyard

Inventor
Ben A. Melvin
By Victor J. Evans
Attorney

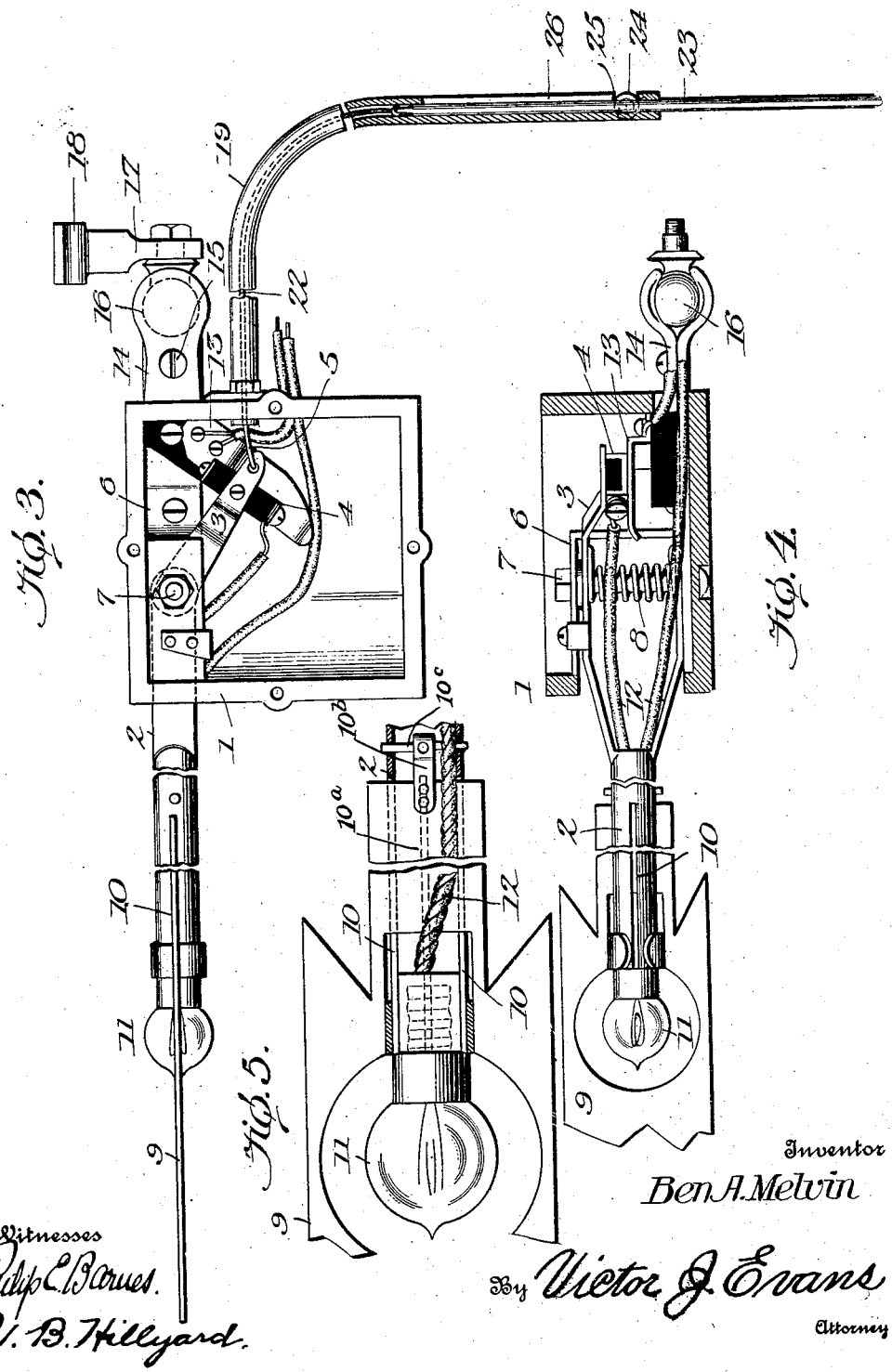

UNITED STATES PATENT OFFICE.

BENJAMIN A. MELVIN, OF SACRAMENTO, CALIFORNIA.

MOTOR-VEHICLE SIGNAL.

1,177,530.   Specification of Letters Patent.   Patented Mar. 28, 1916.

Application filed January 20, 1914. Serial No. 813,277.

*To all whom it may concern:*

Be it known that I, BENJAMIN A. MELVIN, a citizen of the United States, residing at Sacramento, in the county of Sacramento and State of California, have invented new and useful Improvements in Motor-Vehicle Signals, of which the following is a specification.

In many sections of the country where traffic regulations are enforced, operators of motor vehicles are required to signify their intention when turning a corner or when turning the vehicle so that operators of vehicles either in the rear or approaching may be advised of the intention of the operator desiring to turn the machine with the result that a casualty of any kind is avoided. Such signals are usually given by movements of the hand and arm and are not always observable particularly by the operator of a following vehicle.

The present invention provides a signal which is readily observable both by day and night and which may be seen by the operator of a following vehicle as well as by the driver of an approaching machine or vehicle, said signal being illuminated by night and embodying an electric lamp which is included in a circuit that is closed when the signal arm is thrown outward into signaling position.

The invention provides a signal of the character stated which may be readily applied to any make or type of motor vehicle without requiring any change in the construction thereof, such signal enabling the signal arm to be moved vertically or horizontally, as may be found most advantageous according to the nature of the vehicle to which the signal is to be fitted.

The invention consists of the novel features, details of construction and combination of parts, which hereinafter will be more particularly set forth, illustrated in the accompanying drawings, and pointed out in the appended claim.

Figure 1:
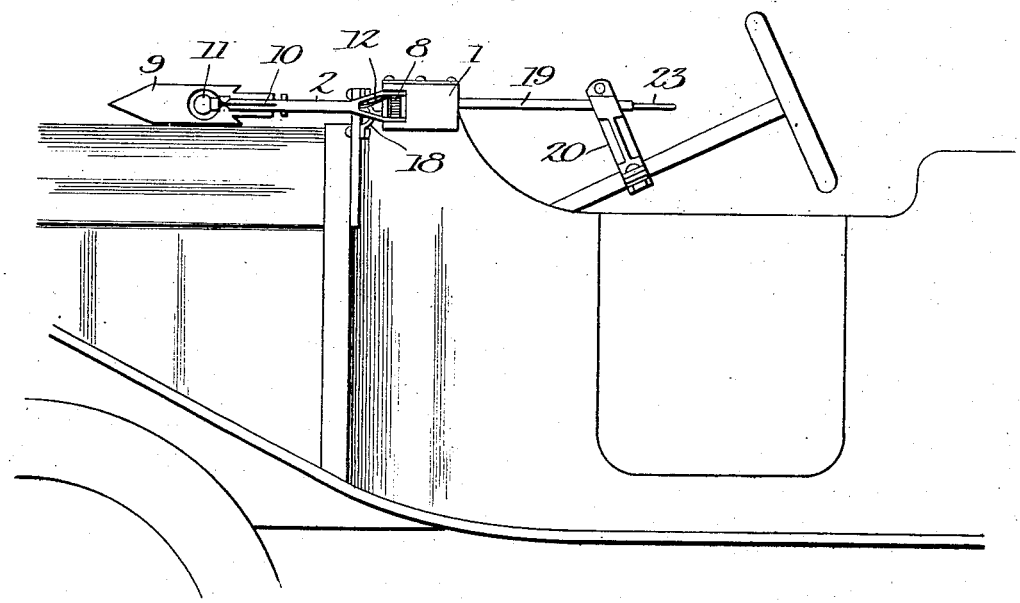
Figure 2:
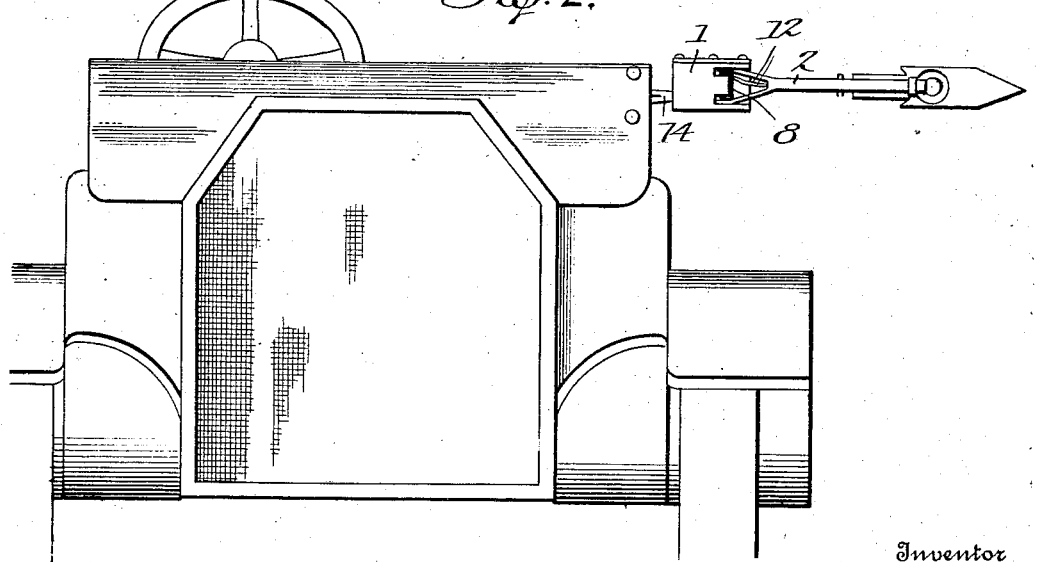

Referring to the drawings, forming a part of the specification, Figure 1 is a detail view showing the application of the invention to an automobile. Fig. 2 is a view showing the signal thrown into operative position for giving warning. Fig. 3 is a detail view bringing out more clearly the relation of the circuit closing means. Fig. 4 is a detail view of a signal arm showing more clearly the means whereby the signal head may be turned or adjusted according to the direction of movement of the arm so as to present a flat side toward the observer. Fig. 5 is an enlarged view of a portion of the head and arm.

Corresponding and like parts are referred to in the following description, and indicated in all the views of the drawings, by the same reference characters.

The signal embodies a box or casing 1 which forms a housing for the circuit closing means. An arm 2 is pivotally connected with the box or casing 1 and has a rear extension 3 to which a contact 4 is attached and to which rear extension an operating wire or like part 5 is attached. A frame 6 is arranged within the box 1 and the arm 2 is pivotally connected thereto. A pin 7 is supported at its ends by means of the frame 6 and the arm 2 which has its inner or rear end bifurcated is mounted upon the pin 7. A coil spring 8 is mounted upon the pin 7 and has one end in engagement with the frame 6 and its opposite end in engagement with the arm 2, such spring serving normally to hold the arm 2 in a position so as not to indicate danger. When the signal is operated to give warning the arm 2 is moved against the tension of the spring 8 and when the force so exerted is released the spring 8 comes into play and returns the arm 2 to normal position, that is, to a position of safety. A head 9, having the general outline of the head of an arrow, is fitted to the outer end of the arm 2 and is adapted to be adjusted with reference to such arm so as to expose its broad side to the observer. The arm 2 is hollow and is formed in its outer portion with parallel longitudinal slots 10 which are adapted to receive the shank 10ª of the head 9. This shank 10ª has secured to its end portion a clip 10ᵇ that in turn engages a pin 10ᶜ arranged transversely of the arm 2. The sides of the head 9 may be finished in any manner and are usually provided with stripes of contrasting color. An opening is formed at the inner end of the head 9 to receive an electric lamp 11. Such lamp is included in an electric circuit, the wires 12 of which pass through the arm 2 and enter the box 1. One of such wires is connected with the contact 4 and the other wire is connected with a contact 13 which is attached to the frame 6. When the signal arm 2 is at the point of safety the lamp circuit is broken, but when such signal arm is thrown outward into signaling position the lamp circuit is closed by means of the contact 4 engaging the contact 13. The electric current for supplying the lamp may be derived from any source.

A stem 14 projects from the box 1 and preferably forms a part of the frame 6 and is hollow and longitudinally split to form clamp members which are adapted to be drawn together by means of a bolt or like fastening 15. A ball 16 is adapted to be gripped between the clamp members of the stem 14, such ball having a shank which is adjustably connected with the stem 17 of a bracket 18 which is adapted to be secured to any convenient part of the vehicle. The several adjustments of the connections 14, 16, 17 and 18 admit of adapting the signal to any convenient location, so that the arm may be swung either in a vertical or horizontal plane.

A tube 19 is connected with the box 1 and a connection 20 serves to secure such tube to the steering column 21 of a motor vehicle. The tube 19 may be bent in any direction, so as to extend from the box 1 to a convenient position within reach of the operator. A wire 22 passes through the tube 19 and is attached to the extension 3 of the arm 2 and such wire is made fast to a hand piece 23 arranged to telescope within the outer end of the tube 19. Such hand piece 23 extends within convenient reach of the operator to be pulled upon when it is required to throw the signal into operative position to give warning. If required the signal may be held in warning position by means of a stop 24 carried by the hand piece 23 engaging a notch 25 formed in a side of the tube 19 and in communication with a longitudinal slot 26 formed in such tube. When the signal is set by drawing the hand piece 23 outward in the tube 19 it may be held in such position by turning the hand piece to cause the stop 24 to enter the notch 25. When the hand piece is turned to bring the stop 24 in line with the longitudinal slot 26 the signal is automatically returned to a position of safety by the action of the spring 8 in the manner stated.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative and that such changes may be made when desired as are within the scope of the claim appended hereto.

Having thus described the invention what is claimed as new, is:—

A signal for vehicles comprising a lever pivoted intermediate its ends to a stationary portion of the vehicle, said lever having one end portion provided with a pair of parallel slots, a signal blade having a rectangular shank portion slidably mounted in the slots, means for holding the shank portion stationary in the slots, said blade having formed therein a circular opening, a lamp carried by the slotted end portion of said lever and arranged in the circular opening, and means for swinging said lever.

In testimony whereof I affix my signature in presence of two witnesses.

BENJAMIN A. MELVIN.

Witnesses:
ALBERT A. LUTENEGGER,
JOHN Q. ADAMS.

Copies of this patent may be obtained for five cents each, by addressing the "Commissioner of Patents, Washington, D. C."